United States Patent
Guo et al.

(10) Patent No.: US 6,744,577 B1
(45) Date of Patent: Jun. 1, 2004

(54) PIEZOELECTRIC ACTUATOR AND SHOCK SENSOR

(75) Inventors: Lin Guo, Milpitas, CA (US); Douglas Martin, Fremont, CA (US); Jye-Kai Chang, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 332 days.

(21) Appl. No.: 09/816,715

(22) Filed: Mar. 23, 2001

(51) Int. Cl.[7] .................... G11B 15/04; G11B 27/36
(52) U.S. Cl. .................... 360/31; 360/60; 360/25; 360/78.12; 360/75; 360/294.4; 360/97.02
(58) Field of Search .................... 360/25, 31, 75, 360/77.04, 78.04, 294.4, 60, 97.02, 78.12, 69

(56) References Cited

U.S. PATENT DOCUMENTS

| | | | |
|---|---|---|---|
| 5,978,167 A | * 11/1999 | Abe | 360/77.04 |
| 5,982,573 A | 11/1999 | Henze | 360/75 |
| 6,515,834 B1 | * 2/2003 | Murphy | 360/294.4 |
| 6,545,846 B1 | * 4/2003 | Chee et al. | 360/294.4 |
| 2001/0012172 A1 | * 8/2001 | Hawwa et al. | 360/78.05 |
| 2002/0067565 A1 | * 6/2002 | Kelemen | 360/75 |
| 2002/0101681 A1 | * 8/2002 | He et al. | 360/78.05 |
| 2003/0011914 A1 | * 1/2003 | Angelo et al. | 360/25 |

* cited by examiner

*Primary Examiner*—David Hudspeth
*Assistant Examiner*—Natalia Figueroa
(74) *Attorney, Agent, or Firm*—Sheridan Ross P.C.

(57) ABSTRACT

A dual purpose piezoelectric element utilized in a disk drive for fine positioning of the head assembly relative to the surface of a disk and for sensing shocks and other vibrations. When a shock is sensed by the piezoelectric element that exceeds a predetermined threshold value, write operations are halted to prevent a write operation occurring at an incorrect location on the disk.

29 Claims, 7 Drawing Sheets

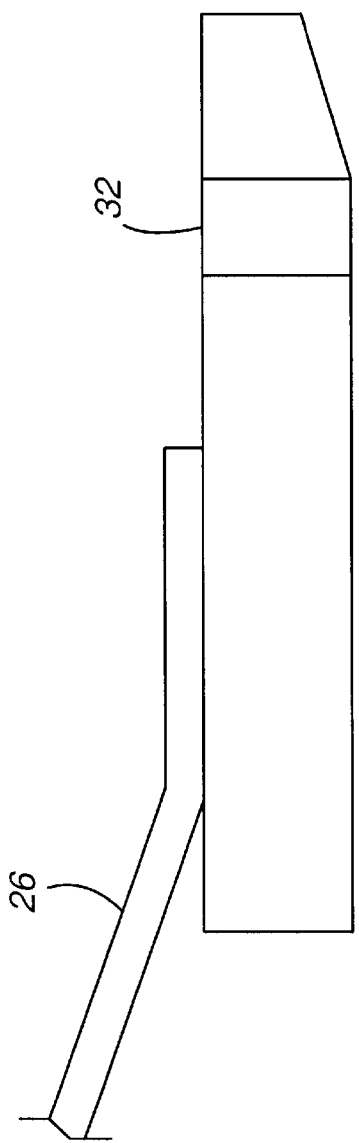
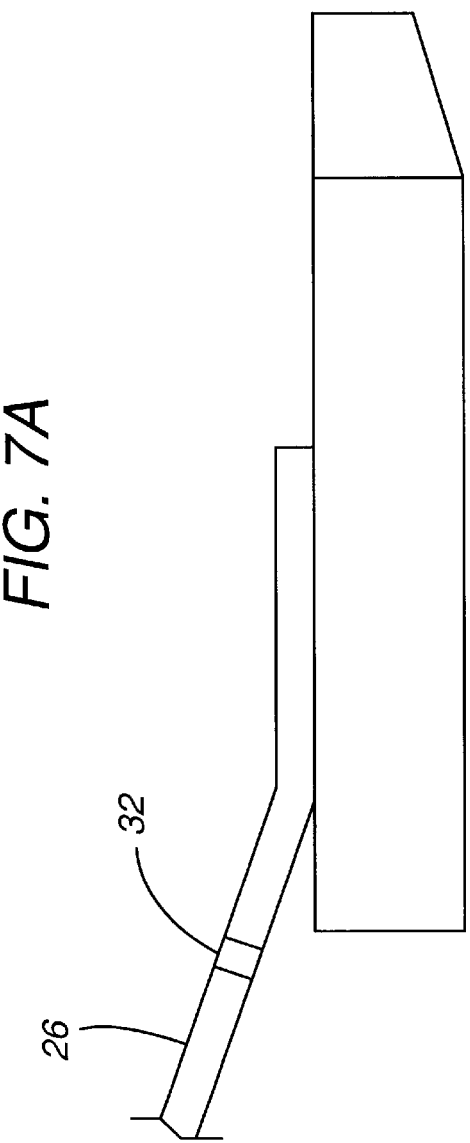
FIG. 7A
FIG. 7B

PIEZOELECTRIC ACTUATOR AND SHOCK SENSOR

FIELD OF THE INVENTION

The present invention relates to shock sensing in a dual-actuator servo system for hard disk drives. More particularly, the present invention is directed to use of a piezoelectric element for both positioning of the actuator and for sensing shocks imparted to the hard disk drive assembly.

BACKGROUND OF THE INVENTION

A hard disk drive typically includes one or more magnetic disks rotatably mounted in association with a spindle and one or more actuators for positioning a transducer or head relative to data tracks on the surface of each disk. The actuator typically comprises a pivotable base plate, a load beam or suspension arm affixed to the base plate, a flexure at the distal end of the load beam and a slider and transducer or a head assembly affixed to the flexure. A voice coil motor induces movement of the actuator to position the head relative to the disk surface. Typically, the voice coil motor and servo system provide both gross positioning of the head, i.e., track to track positioning, and fine positioning, i.e., track following. Recently, piezoelectric elements have been incorporated into actuators to provide fine positioning of the head assembly for track following purposes, rather than only relying upon the voice coil motor for fine positioning.

With the emphasis on making hard drives smaller, for numerous applications including portable computers, magnetic disks are not only becoming smaller, but data tracks are becoming increasingly more densely positioned on the disks and the tracks themselves are becoming physically narrower. As a result, maintaining the transducer or head in an accurate track following position for purposes of reading and writing is becoming more complex. To accommodate increasingly finer adjustments in the position of the magnetic head, dual positionable actuators have been introduced. In a first mode, a voice coil motor will move the actuator from track to track. In a second mode, the voice coil motor will provide fine positioning of the distal end and head assembly, together with a piezoelectric element positioned on the actuator. By supplying a current to the piezoelectric element, the piezoelectric element can expand and contract in a controlled manner to adjust the distal end of the actuator arm and thereby accurately maintain position of the head relative to the disk surface.

Piezoelectric elements are also used as shock sensors in disk drives. Specifically, as applications for disk drives place the drives in mobile environments, such as with portable computers, the chance of external shock being imparted to the disk drive is increasing. In this context, an external shock may be strong enough to dislodge the head from its intended position. If this were to occur during a read operation, an error would result and the read operation would need to be redone. However, if a shock moves a head during a write operation, a more significant problem can occur. It is conceivable that the information being written could be written to a wrong location. Therefore, it is imperative to be able to shut down a write operation before the event could occur. The present invention addresses and solves this problem by utilizing a piezoelectric shock sensor to determine the presence of a shock and, if necessary given the magnitude of the shock, to abort write operations.

SUMMARY OF THE INVENTION

The present invention combines the functionality of actuator positioning and shock sensing into a common element. Direct measurement of shock during track following improves performance and reduces the possibility of track encroachment, i.e. writing information to an incorrect or unintended location. By utilizing common piezoelectric elements for both track following and shock sensing, the present invention lowers the cost of disk drives by removing superfluous elements, together with unnecessary and detailed wiring as would be the case with a separate shock sensor and actuator positioning element.

The present invention advantageously utilizes the physics of piezoelectric elements in which movement is generated when a charge is applied across a piezoelectric element and conversely, a voltage is generated when a motion is forced on the piezoelectric element. These characteristics allow piezoelectric elements to be used as both actuators and sensors simultaneously. Although the preferred embodiment disclosed is described in terms of controlled charge and sensed voltage, a person of skill in the art will recognize that voltage could be controlled and charged sensed with the same result. The present invention is not intended to be limited to a charge controlled piezoelectric system. Rather, it is intended to cover any use of a common piezoelectric element or its equivalent.

A piezoelectric element is a crystal or quartz structure. Compression of the element generates an electrostatic voltage across it and conversely, application of an electric field causes the crystal to expand or contract. The polarization of a piezoelectric crystal is parallel to the axes of the crystal. The magnitude of the polarization is proportional to the stress and/or strain (compression and/or tension) applied to the crystal. Importantly, the direction of the polarization is reversed when the strain changes from compression to tension, and vice versa. For example, if a piezoelectric element is subjected to an alternating current, it will alternately expand and contract. Conversely, subjecting the piezoelectric element to a tension and compression force will generate a voltage, but in opposite directions.

BRIEF DESCRIPTION OF THE DRAWINGS

For a more complete understanding of this invention, one should now refer to the embodiment illustrated in greater detail in the accompanying drawings and described below by way of example of the invention. In the drawings:

FIG. 7A depicts a slider interconnected to a flexure in accordance with an embodiment of the present invention.

FIG. 7B depicts a slider interconnected to a flexure in accordance with another embodiment of the present invention.

While the following disclosure describes the invention in connection with two embodiments, one should understand the invention is not limited to these embodiments. Furthermore, one should understand that the drawings are not necessarily to scale and that graphic symbols, diagrammatic representatives and fragmentary use, in part, may illustrate the embodiment. In certain instances, the disclosure may not include details which are not necessary for an understanding of the present invention such as conventional details of fabrication and assembly.

DETAILED DESCRIPTION OF THE PREFERRED EMBODIMENT

Figure 1:
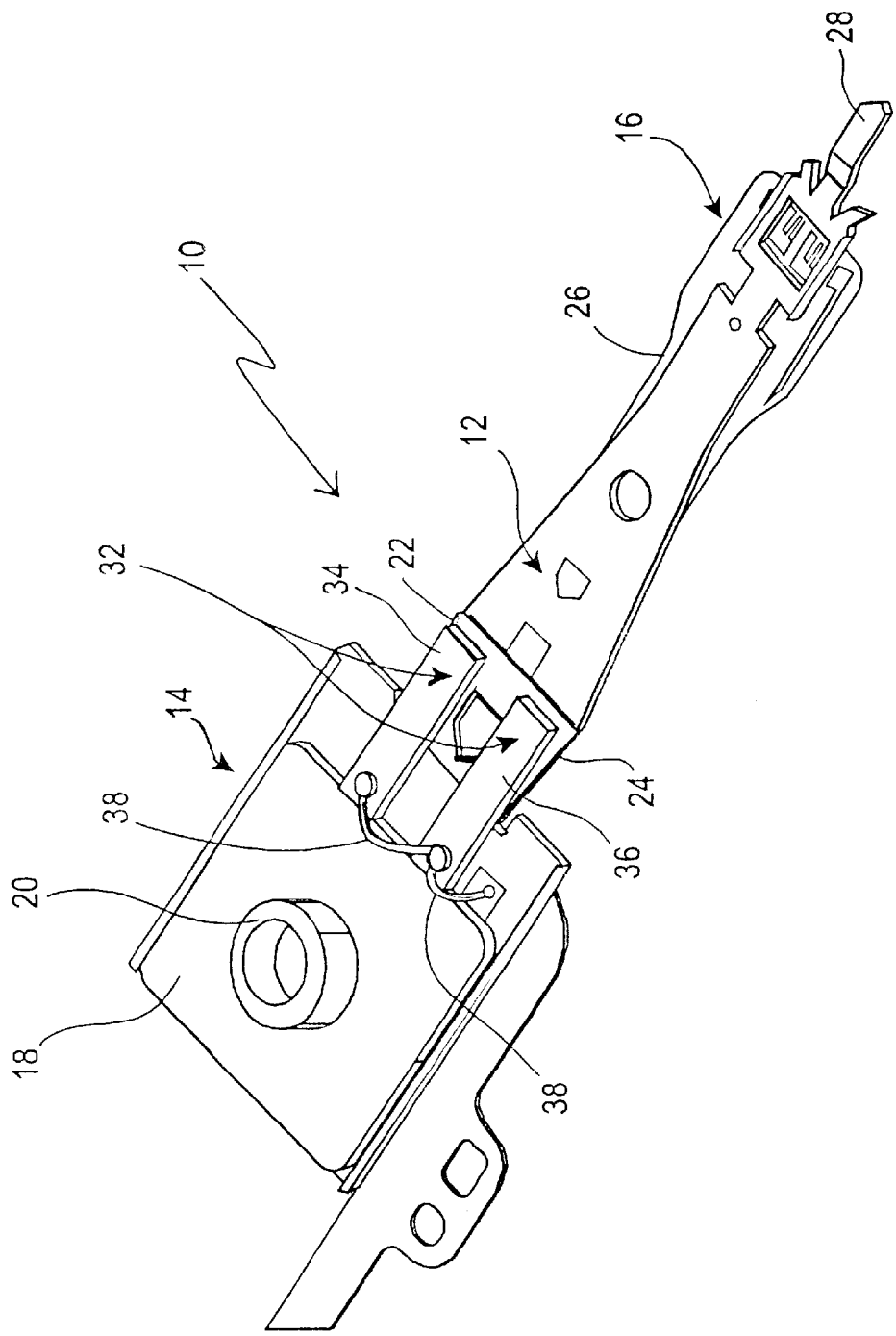
FIG. 1 is a three-quarter perspective view of a suspension load beam of the present invention.

Turning to FIG. 1, an embodiment of the forward or distal end of an actuator 10 of the present invention is illustrated. As can be seen, the forward end of the actuator arm 10 comprises a suspension load beam 12 which includes a secured end portion 14 attached to an actuator arm (not shown) and a suspended end portion 16 opposite the secured end portion. Attachment of the suspension load beam 12 to the actuator arm is accomplished by swaging, although other methods of attachment known to those skilled in the art could be used. More particularly, a swage plate 18 with a cylindrical portion or bushing 20 is positioned in a complementary hole in the distal end of an actuator arm (not shown) and the adjacent metal surfaces are swaged or joined together. A pair of arm segments 22, 24 extend between the main body of the rear portion 14 of the suspension load beam 12 and the forward portion 16. At the forward end 16, the suspension load beam 12 supports a flexure member 26, which in turn supports a slider, including a magnetic head that reads and writes digital information to and from the disk (not shown). An extension member 28 cooperates with an on-off ramp (not shown) for parking the magnetic head when the disk drive is not in use.

A piezoelectric element 32 comprising two piezoelectric crystals 34, 36 having generally the same physical configuration and properties, are affixed to the arm segments 22, 24. The piezoelectric crystals 34, 36 are positioned on the arm segments 22, 24 with opposed polarizations. A wire 38 electrically connects each of the piezoelectric crystals 34, 36 to a processor on the printed circuit board of the hard drive (not shown). In this manner, a voltage can be equally applied simultaneously across both piezoelectric crystals 34, 36 to induce movement in the crystals to cause adjustment of the position of the magnetic head relative to the surface of the disk. Because the two piezoelectric crystals 34, 36 have similar characteristics or properties, but are positioned on the arm segments 22, 24 with opposed polarities, application of a uniform voltage or current will cause the crystals to move in unison, with one crystal contracting and the other expanding the same amount. The correlation between the amount of voltage or current to be applied for a given quantity of movement is known such that an algorithm resident within a processor on the printed circuit board can actually determine the amount of voltage to be applied for purposes of generating the appropriate movement necessary to maintain track following based upon servo feedback. Thus, while a voice coil motor moves the actuator arm 10 to reposition the magnetic head from one track to another and to correctly position it on the desired track, the piezoelectric element 32 is used for maintaining the fine position of the magnetic head over a desired track.

Figure 6:
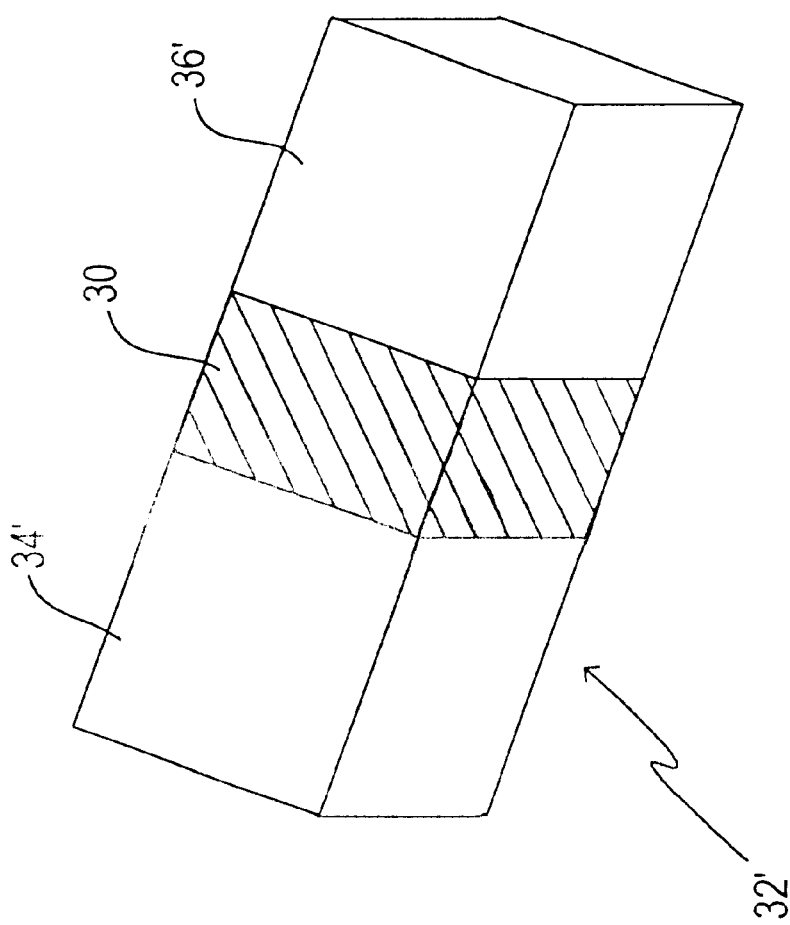
FIG. 6 is a three-quarter perspective view of an alternative embodiment of a piezoelectric crystal of the present invention.

Alternatively, as shown in FIG. 6, a single piezoelectric element 32' may be utilized instead of two separate elements. In such an embodiment, the piezoelectric element 32' would have two portions 34' and 36' of opposed polarity separated by an insulating section 30. As with the previously described embodiment, either voltage or charge can be controlled to cause adjustment in the position of the actuator arm. In addition, in either embodiment, the piezoelectric element 32 or 32' may be positioned on the slider rather than on the actuator arm.

The same piezoelectric element 32 can also function as a shock sensor. More specifically, the piezoelectric element 32 can sense a shock applied to the disk drive and, if the shock exceeds a threshold amount, halt a write operation in progress or about to commence. For example, if a shock is applied to the disk drive, such as would occur if a laptop computer were dropped or jostled during use, a shock wave would travel through the computer and disk drive. As the shock wave travels through the piezoelectric element 32, a voltage would be induced in the piezoelectric element. The magnitude of the voltage will indicate the magnitude of the shock. Thus, by measuring the induced voltage and comparing it against a threshold number, a write operation can be suspended or halted if the shock is deemed large enough to move the head off track and thereby prevent encroachment on an adjacent or nearby track. While the threshold amount can be varied, for exemplary purposes a shock level that would cause the head to move more than fifteen to eighteen percent (15–18%) off track can be the threshold amount that would halt a write operation. Accordingly, if a shock occurs deforming the piezoelectric element and the piezoelectric element generates a voltage which indicates the head is off track by fifteen to eighteen percent or more, or some other predetermined amount, a write operation can be suspended before the head unintentionally encroaches the wrong track and writes to the disk in the wrong location.

Figure 2:
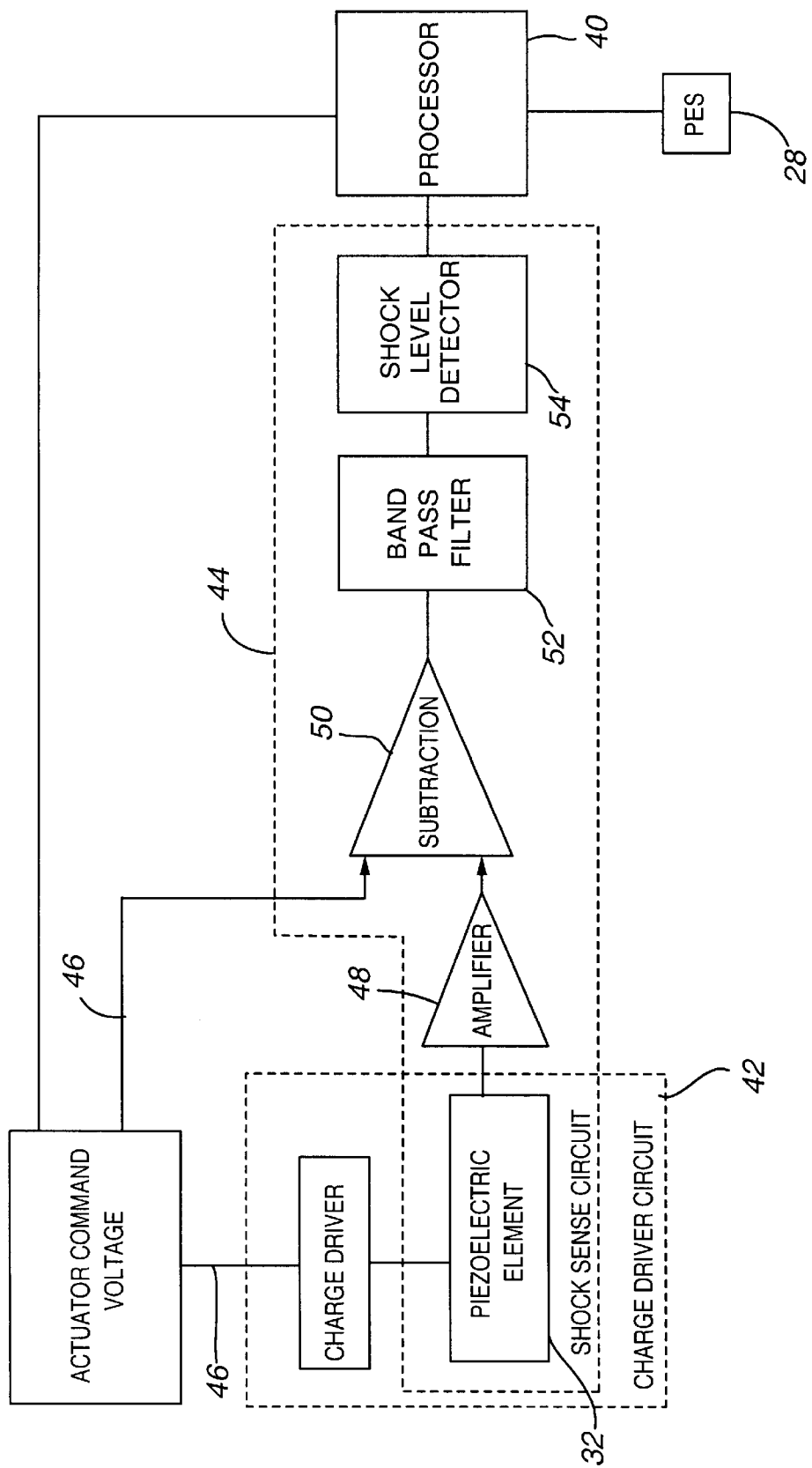
FIG. 2 is a block diagram representative of the logic of the present invention.

FIG. 2 is a block diagram of the electric circuitry of the preferred embodiment of the present invention. As is illustrated, the piezoelectric element 32 is a component of both the charge driver circuit 42, which controls lateral movement of the flexure 26 and magnetic head of the actuator 10 by inducing movement of the piezoelectric element 32, and shock sense circuit 44, which senses a shock imparted to the disk drive. Voltage is supplied to the charge driver circuit 42 and the piezoelectric element 32 for purposes of micro movement of the flexure 26 and magnetic head. This control or command voltage 46 is typically much larger than the voltage generated in the piezoelectric element 32 as the result of a shock imparted to the drive. Thus, the command voltage 46 must be subtracted from the voltage sensed at the piezoelectric element. The voltage across the piezoelectric element 32 is amplified by op amp 48 and is passed to a subtraction circuit, in this case op amp 50, for purposes of subtracting the command voltage from the measured voltage. The resulting voltage is due to the shock imparted on the disk drive. In the preferred embodiment, the resulting voltage signal is then passed through a band pass filter 52 to eliminate noise and drift from the signal. The band pass filter 52 is selected to allow the resonant frequency of the piezoelectric element 32 to pass while filtering other undesired signals of different frequencies. That remaining voltage is then compared to a threshold voltage level by a comparator 54. If the voltage is greater than the threshold, a signal is sent to a processor 40 to halt any write operation in progress or about to be initiated. If this resultant voltage is less than a threshold voltage, no action is taken to alter the operation of the drive. The processor 40 also controls the position of the actuator arm based upon the position error signal (PES)

Figure 3:
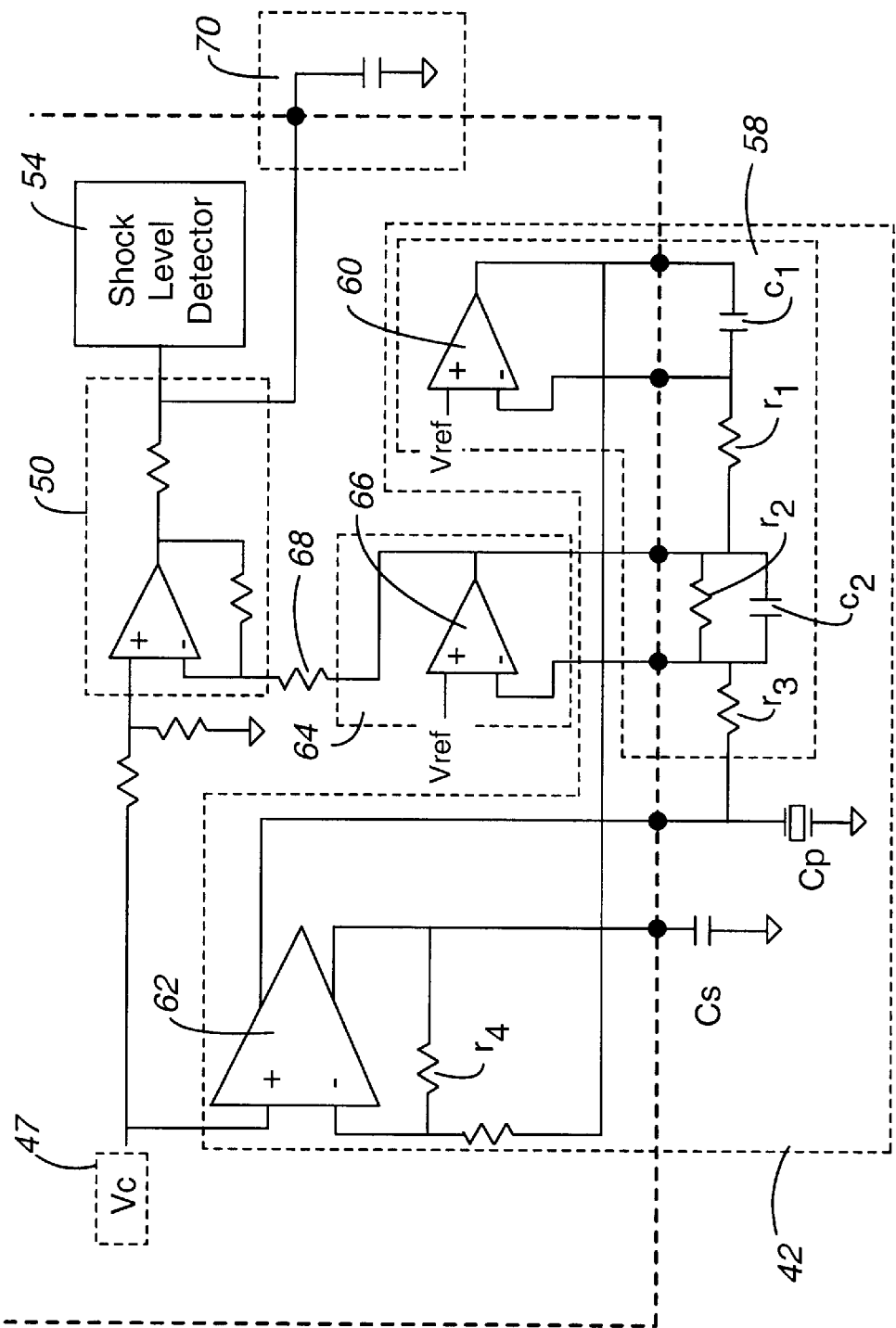
FIG. 3 is a circuit diagram for one embodiment of the present invention.
Figure 4:
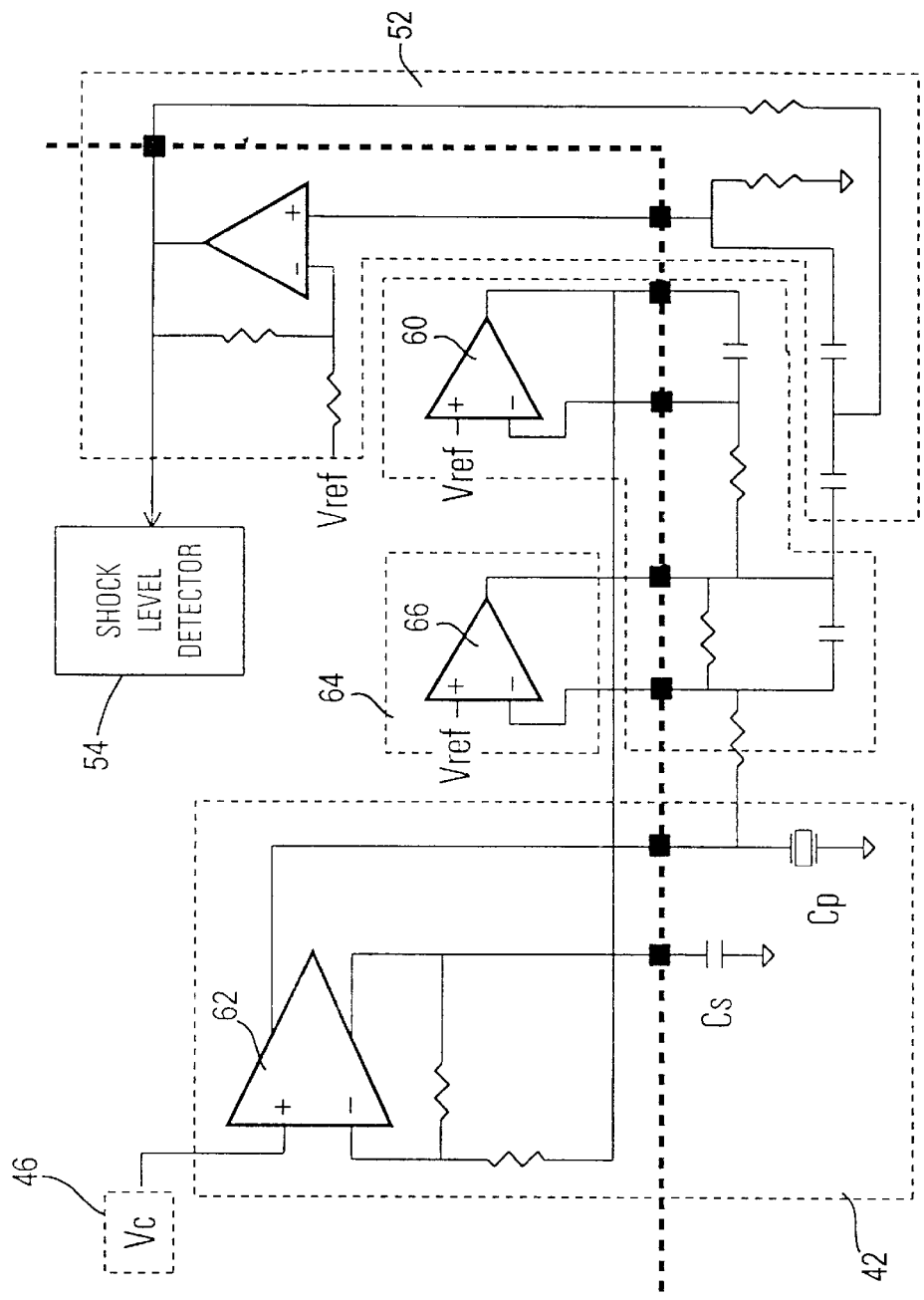
FIG. 4 is a circuit diagram for a second embodiment of the present invention.

FIGS. 3 and 4 show two different circuit diagrams for implementing the present invention. In the embodiment of FIG. 3, a number of components comprise the overall circuit. The charge driver circuit is depicted by box 42. The charge driver circuit is responsible for supplying either voltage or current to the piezoelectric element 32 in its capacity as a micro actuator for positioning the head assembly relative to the tracks on the disk. Included within the charge driver circuit 42 is a capacitor $C_p$ which represents the piezoelectric element 32, and capacitor $C_s$, which is a sensing element. The capacitor $C_s$ is in parallel with the capacitor $C_p$ and the relationship between the two elements is known. This parallel relationship is important with respect to movement of the head assembly, as it is difficult to get direct measurement of the charge from the piezoelectric element $C_p$. By regulating the sensing element $C_s$, it is possible to also regulate the piezoelectric element $C_p$.

A DC restore circuit is depicted by box 58. The DC restore circuit 58 is part of the charge drive circuit 42 and assists in correcting drifting problems with the signal provided to the piezoelectric element $C_p$ by maintaining the voltage across the piezoelectric element $C_p$ centered. The DC restore circuit 58 and the charge drive circuit 42 each include an op amp 60 and 62, respectively, together with a number of resistors $r_1$, $r_2$, $r_3$, $r_4$ and a pair of capacitors $c_1$ and $c_2$ whose value are selected based upon the characteristics of the disk drive in question, as would be known and understood by a person of ordinary skill in the art.

Box 64 includes the components which measure or sense the voltage across the piezoelectric element. In this embodiment, the op amp 66 is connected to the piezoelectric element $C_p$ and measures the voltage across the piezoelectric element $C_p$.

The command voltage 46 which drives the piezoelectric element $C_p$ in its function as a micro actuator, is shown in the upper left hand corner of FIG. 3. This command voltage 46 is supplied to the charge drive circuit 42 as well as to a subtractor circuit indicated by box 50. The subtraction circuit 50 receives the command voltage 46 as well as the output voltage from the piezoelectric element 32 via line 68. Subtraction circuit 50 subtracts the command voltage 46 from the reference signal 68 received from the piezoelectric sensing element 64, which senses the voltage across the piezoelectric element 32. The resulting signal is forwarded to a shock level detector 54 which compares the level of the received signal against a threshold level. The threshold level can be set to any value appropriate for the particular drive. An example is a level that would move the head assembly fifteen percent (15%) or more off track. If the reference voltage 68 is greater than the threshold level, the threshold level detector 54 forwards a signal to a processor 40 within the drive to halt any write operation that is in progress or about to be initiated. If the reference voltage 68 is less than the threshold level, no action is taken.

A low pass filter is depicted at box 70 for eliminating high frequency noise in the signal sent from the subtraction circuit to the shock level detector.

FIG. 4 is similar to the circuitry of FIG. 3, with two exceptions. FIG. 4 includes a band pass filter shown by box 52. In addition, the embodiment of FIG. 4 does not include a subtraction element for removing the command voltage 46 from the reference voltage 68 measured across the piezoelectric sensing element 64. Rather, in the embodiment of FIG. 4, the band pass filter 52 operates to filter the command voltage 46, rather than subtracting it from the reference signal 68.

In operation, a shock excites a particular mode in a piezoelectric element at a frequency which is generally much higher than a command signal frequency. Typically, this results in a high frequency distinctive peak in the signal produced from the piezoelectric element. A band pass filter allows the distinctive frequency associated with the piezoelectric element to pass, but filters out all remaining frequencies. In practice, while either of the embodiments shown in FIG. 3 or 4 can be employed with success, a hybrid system employing both approaches may also be utilized. The hybrid approach is shown in the block diagram of FIG. 2.

Figure 5:
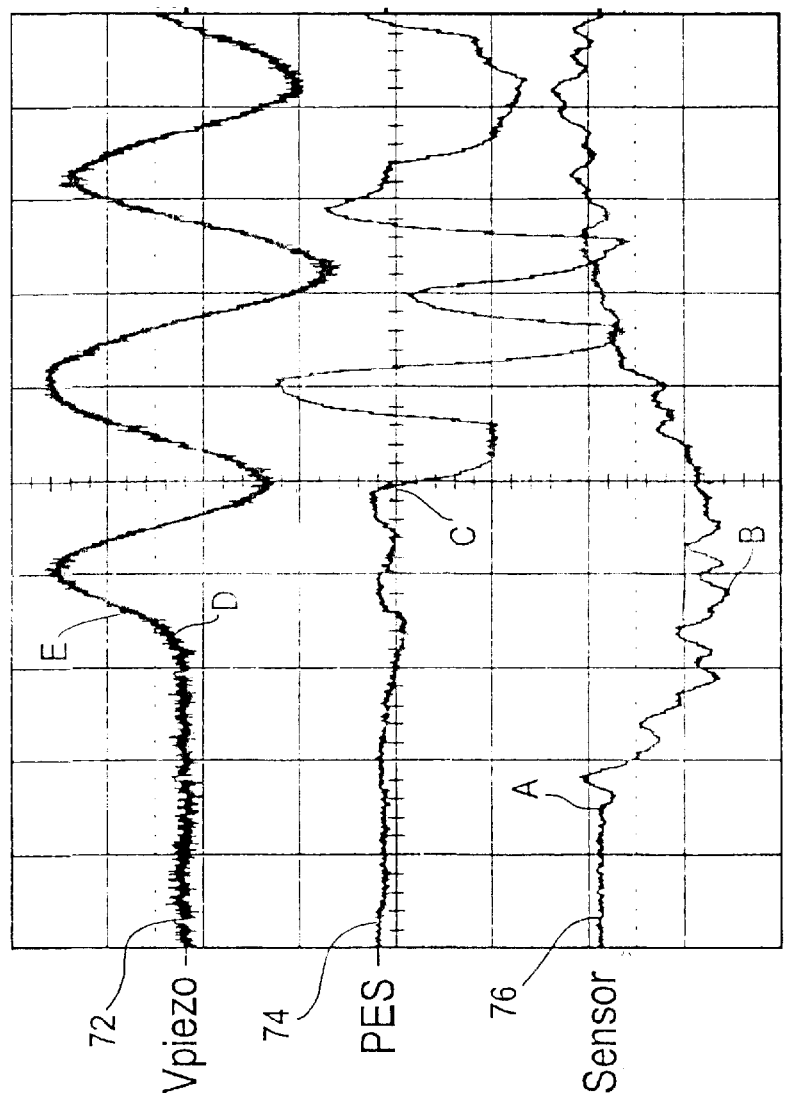
FIG. 5 is a comparison of separate traces for position error signal, piezoelectric voltage and shock sensor response simultaneously measured at the time a single shock is applied to a hard disk drive.

FIG. 5 comprises three traces of three different signals measured in a disk drive and is intended to be illustrative of the present invention. The upper trace 72 is the voltage measured across a piezoelectric element. The central trace 74 is the position error signal (PES) for the disk drive. The lower trace 76 is the response of a shock sensor mounted to the base of a disk drive. The x-axis is representative of time (100 micro-seconds per vertical grid line). The y-axis for trace 72, piezoelectric voltage, is 200 millivolts per horizontal grid line. The y-axis for trace 74, the position error signal, is 1 volt per horizontal grid line. The y-axis for the trace 76, the shock wave, is 0.2 volts per horizontal grid line.

Lower trace 76, representative of the shock wave, shows at point A the initiation of the shock approximately 160 micro-seconds (ms) from the left hand edge of the plot. The shock wave peaks approximately 200 micro-seconds later at point B. Based upon the position error signal, trace 74, the head assembly moves significantly off track approximately 340 micro-seconds after initiation of the shock wave, point C, and approximately 120 micro-seconds after the initial peak of the shock wave. However, as can be seen by trace 72, the voltage across the piezoelectric element, a voltage signal is produced by the piezoelectric element indicative of the presence of the shock approximately 160 micro-seconds before the head assembly moves, as shown by a comparison of point D on trace 72 to point C of the position error signal, trace 74. Assuming a threshold voltage value of a half value of the piezoelectric response, point E, the time difference between this threshold event and the position error signal showing significant movement of the head assembly is approximately 130 micro-seconds. Even incorporating a signal processing delay of approximately 20 micro-seconds results in roughly 110 micro-second warning time to halt a write operation.

While a preferred embodiment and some alternative embodiments have been shown and described, it will be apparent that other modifications, alterations and variations may be made by and will occur to those skilled in the art to which this invention pertains, particularly upon consideration of the foregoing teachings. For example, the piezoelectric element can be a single, integrated structure having at least two piezoelectric positions of opposed polarity or it may be two or more discrete structures. Also, the piezoelectric elements may be positioned on the actuator arm or on the slider. In addition, the threshold percentage by which the head is deemed offtrack as sensed by the piezoelectric element can vary depending upon the needs of an end user, taking into account how the disk drive will be used. It is therefore contemplated that the present invention is not limited to the embodiments shown and described and that such modifications and other embodiments as incorporate those features which constitute the essential functions of the invention are considered equivalent and within the true spirit and scope of the present invention.

What is claimed is:

1. A hard disk drive comprising:
   at least one disk rotatable about an axis;
   an actuator assembly moveable relative to said disk;
   a transducer positioned on said actuator assembly;

a charge driver circuit;

a piezoelectric element disposed on said actuator assembly and electrically interconnected to said charge driver circuit, wherein said piezoelectric element is operable for moving at least the transducer relative to a surface of the disk and for sensing a shock imparted to the drive; and a sensing element, wherein said sensing element is electrically interconnected to said charge driver circuit and is in parallel with said piezoelectric element.

2. The hard disk drive of claim 1 wherein said piezoelectric element comprises at least two piezoelectric crystals.

3. The hard disk drive of claim 2 wherein said crystals are disposed on said actuator assembly with opposed polarizations such that said crystals work in unison to reposition said transducer.

4. The disk drive of claim 1, wherein said piezoelectric element induces a signal which controls the write operation of the drive.

5. The hard disk drive of claim 1, further comprising a subtraction circuit operable to remove at least a portion of a command voltage from a signal associated with said piezoelectric element.

6. The hard disk drive of claim 5, wherein said subtraction circuit includes a first input for receiving a command voltage and a second input for receiving said signal associated with said piezoelectric element.

7. The hard disk drive of claim 1, further comprising a filter operable to remove selected frequencies from a signal associated with said piezoelectric element.

8. The hard disk drive of claim 1, further comprising a DC restore circuit operable to correct drift in said signal associated with said piezoelectric element.

9. The hard disk drive of claim 1, wherein said sensing element comprises a capacitor.

10. In a hard disk drive having at least one disk, a transducer for reading data from and/or writing data to the disk, an actuator for positioning the transducer relative to the disk and a voice coil motor for imparting movement to the actuator, the improvement comprising a dual purpose piezoelectric element which provides both fine positioning of the transducer relative to the disk and which senses shocks imparted to the drive in combination with a sensing element, wherein a voltage across said sensing element comprises a signal indicating a shock.

11. The hard disk drive of claim 10, wherein said piezoelectric element induces a signal which controls the write operation of the drive.

12. A hard disk drive comprising:

a base;

a disk rotatable relative to the base;

an actuator moveable relative to the disk;

a transducer disposed on said actuator for reading data from or writing data to the disk;

piezoelectric means for both sensing shock imparted to the base and for adjustably positioning the transducer relative to the disk; and sensor means for providing a measurement of a charge across said piezoelectric means.

13. The hard disk drive of claim 12, wherein said piezoelectric means is at least two piezoelectric crystals positioned on said actuator.

14. The hard disk drive of claim 13, further comprising a processor operative associated with said piezoelectric crystals such that the processor can terminate a write operation if the transducer moves off track a predetermined distance.

15. A method for controlling the write operation in a hard disk drive, comprising:

positioning a piezoelectric element on the actuator assembly of a disk drive;

providing an input signal to and an output signal from the piezoelectric element;

inducing the piezoelectric element to reposition the distal end of the actuator by providing an input signal to the piezoelectric element;

sensing the presence of a shock through the piezoelectric element, wherein said sensing includes removing said input signal from a voltage across the piezoelectric element, and wherein said input signal comprises a command voltage; and terminating a write operation if the shock exceeds a predetermined level.

16. The method of claim 15, wherein the step of positioning a piezoelectric element comprises positioning at least two piezoelectric elements on said actuator assembly with the polarizations of said piezoelectric elements opposed to each other in order that said piezoelectric elements work in unison to reposition a transducer.

17. A hard disk drive comprising:

at least one disk rotatable about an axis;

an actuator assembly moveable relative to said disk;

a transducer positioned on said actuator assembly;

a piezoelectric element disposed on said actuator assembly and operable for moving at least the transducer relative to a surface of the disk and for sensing a shock imparted to the drive; and a subtraction circuit operable to remove at least a portion of a command voltage from a signal associated with said piezoelectric element.

18. The hard disk drive of claim 17, wherein said piezoelectric element comprises at least two piezoelectric crystals.

19. The hard disk drive of claim 18, wherein said crystals are disposed on said actuator assembly with opposed polarizations such that said crystals work in unison to reposition said transducer.

20. The disk drive of claim 17, wherein said piezoelectric element induces a signal which controls the write operation of the drive.

21. The hard disk drive of claim 17, further comprising a sensing element in parallel with said piezoelectric element.

22. The hard disk drive of claim 21, wherein said sensing element comprises a capacitor.

23. In a hard disk drive having at least one disk, a transducer for reading data from and/or writing data to the disk, an actuator for positioning the transducer relative to the disk and a voice coil motor for imparting movement to the actuator, the improvement comprising a dual purpose piezoelectric element which provides both fine positioning of the transducer relative to the disk and which senses shocks imparted to the drive in combination with a subtraction circuit.

24. The hard disk of claim 23, wherein said piezoelectric element induces a signal which controls the write operation of the drive.

25. A hard disk drive comprising:

a base;

a disk rotatable relative to the base;

an actuator moveable relative to the disk, wherein said actuator includes a flexure;

a transducer disposed on said actuator for reading data from or writing data to the disk;

piezoelectric means for both sensing shock imparted to the base and for adjustably positioning the transducer relative to the disk; and means for subtracting a command voltage from a signal comprising a voltage across said piezoelectric means.

26. The hard disk drive of claim 25, wherein said piezoelectric means is at least two piezoelectric crystals positioned on said actuator.

27. The hard disk drive of claim 26, further comprising a processor operative associated with said piezoelectric crystals such that the processor can terminate a write operation if the transducer moves off track a predetermined distance.

28. A method for controlling the write operation in a hard disk drive, comprising:

positioning a piezoelectric element on a slider of a disk drive;

providing an input signal to and an output signal from the piezoelectric element;

inducing the piezoelectric element to reposition the distal end of the actuator by providing an input signal to the piezoelectric element;

sensing the presence of a shock through the piezoelectric element at the same time that said input signal is provided to the piezoelectric element;

terminating a write operation if the shock exceeds a predetermined level.

29. The method of claim 28, wherein the step of positioning a piezoelectric element comprises positioning at least two piezoelectric elements on said slider with the polarizations of said piezoelectric elements opposed to each other in order that said piezoelectric elements work in unison to reposition the transducer.

* * * * *